United States Patent
Haapanen

(10) Patent No.: US 11,894,973 B2
(45) Date of Patent: Feb. 6, 2024

(54) ASSIGNING AND PRIORITIZING MEDIATION SERVERS FOR MONITORING LEGACY DEVICES

(71) Applicant: Tom Haapanen, Ontario (CA)

(72) Inventor: Tom Haapanen, Ontario (CA)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/692,088

(22) Filed: Mar. 10, 2022

(65) Prior Publication Data

US 2023/0291642 A1  Sep. 14, 2023

(51) Int. Cl.
*H04L 41/0686* (2022.01)
*H04L 43/0811* (2022.01)
*H04L 41/069* (2022.01)

(52) U.S. Cl.
CPC ........ *H04L 41/0686* (2013.01); *H04L 41/069* (2013.01); *H04L 43/0811* (2013.01)

(58) Field of Classification Search
CPC . H04L 41/0686; H04L 41/069; H04L 43/0811
See application file for complete search history.

(56) References Cited

U.S. PATENT DOCUMENTS

| | | |
|---|---|---|
| 6,167,445 A | 12/2000 | Gal |
| 6,405,310 B1 | 6/2002 | Simpson |
| 6,681,225 B1 | 1/2004 | Uceda-Sosa |
| 6,834,298 B1 | 12/2004 | Singer |
| 6,941,374 B1 | 9/2005 | Kronz |

(Continued)

FOREIGN PATENT DOCUMENTS

| | | |
|---|---|---|
| EP | 1768306 A | 3/2007 |
| JP | 2004178553 A | 6/2004 |

(Continued)

OTHER PUBLICATIONS

Haapanen, U.S. Appl. No. 17/691,941, filed Mar. 10, 2022, Notice of Allowance and Fees Due, dated Nov. 1, 2022.

(Continued)

*Primary Examiner* — Mohamed A. Wasel
*Assistant Examiner* — James Ross Hollister
(74) *Attorney, Agent, or Firm* — Hickman Becker Bingham Ledesma LLP

(57) ABSTRACT

Techniques for coordinating the monitoring of output devices. In one technique, one or more messages are received, at a mediation service, over a computer network from a cloud-based management server. The one or more messages include an identity of an output device, an identity of an active mediation service for the output device, and an identity of each failover mediation service in one or more failover mediation services for the output device. Based on the one of the messages, the mediation service determines that it is a failover mediation service. Later, it is determined whether the mediation service is to be a new active mediation service for the output device. In response to an affirmative determination, the mediation service transmits, to the cloud-based management server, a notification that indicates that the mediation service is the new active mediation service. The mediation service also initiates monitoring of the output device.

20 Claims, 4 Drawing Sheets

(56) References Cited

U.S. PATENT DOCUMENTS

| | | |
|---|---|---|
| 8,161,162 B1 | 4/2012 | Sutherland |
| 8,813,167 B2 | 8/2014 | Mantere |
| 8,942,686 B2 | 1/2015 | Wright |
| 8,994,539 B2 | 3/2015 | Grohman et al. |
| 9,026,145 B1 | 5/2015 | Duleba |
| 9,106,479 B1 | 8/2015 | Mukerji |
| 10,200,842 B1 | 2/2019 | Roy et al. |
| 10,555,357 B1 | 2/2020 | Sharma |
| 2002/0029278 A1 | 3/2002 | Shiouchi |
| 2002/0129249 A1 | 9/2002 | Maillard |
| 2003/0195957 A1 | 10/2003 | Banginwar |
| 2003/0200285 A1 | 10/2003 | Hansen et al. |
| 2004/0022258 A1 | 2/2004 | Tsukada |
| 2004/0139188 A1 | 7/2004 | Imai |
| 2004/0158632 A1 | 8/2004 | Sasaki |
| 2004/0215760 A1 | 10/2004 | Bergeot |
| 2004/0243994 A1 | 12/2004 | Nasu |
| 2005/0044268 A1 | 2/2005 | Johnston-Watt et al. |
| 2005/0114397 A1 | 5/2005 | Doshi et al. |
| 2006/0077988 A1 | 4/2006 | Cheng et al. |
| 2006/0182042 A1 | 8/2006 | Nasu |
| 2008/0189774 A1 | 8/2008 | Ansari |
| 2008/0222604 A1 | 9/2008 | Murphy |
| 2009/0048022 A1 | 2/2009 | Iddings |
| 2009/0248842 A1 | 10/2009 | Hasimoto |
| 2010/0241738 A1 | 9/2010 | Noguchi |
| 2010/0250497 A1 | 9/2010 | Redlich et al. |
| 2010/0313242 A1 | 12/2010 | Sato |
| 2011/0252240 A1 | 10/2011 | Freedman |
| 2012/0047054 A1 | 2/2012 | Vasinkevich |
| 2012/0136461 A1 | 5/2012 | Satoh |
| 2012/0239821 A1 | 9/2012 | Hozumi |
| 2012/0278454 A1 | 11/2012 | Stewart et al. |
| 2012/0284506 A1 | 11/2012 | Kravitz |
| 2013/0016628 A1 | 1/2013 | Bertani |
| 2013/0036216 A1 | 2/2013 | Chakravarthy |
| 2013/0067043 A1 | 3/2013 | Gaitonde |
| 2013/0070780 A1 | 3/2013 | Hozumi |
| 2013/0204996 A1 | 8/2013 | Takazawa |
| 2013/0329047 A1 | 12/2013 | Jankowski et al. |
| 2014/0228009 A1 | 8/2014 | Chen |
| 2014/0229606 A1* | 8/2014 | Griswold ............ H04L 41/069 709/224 |
| 2014/0304700 A1 | 10/2014 | Kim |
| 2014/0325090 A1 | 10/2014 | Michelin |
| 2015/0019699 A1 | 1/2015 | Postal |
| 2015/0067129 A1 | 3/2015 | Hayashi |
| 2015/0106216 A1 | 4/2015 | Kenderov |
| 2016/0036777 A1 | 2/2016 | Bartlett |
| 2016/0072847 A1 | 3/2016 | Bremen et al. |
| 2016/0088020 A1 | 3/2016 | Chan |
| 2016/0100278 A1 | 4/2016 | Stephens et al. |
| 2016/0112339 A1 | 4/2016 | Cheemalapati et al. |
| 2016/0234186 A1 | 8/2016 | Leblond |
| 2017/0126664 A1 | 5/2017 | Khandelwal |
| 2017/0223128 A1 | 8/2017 | Shuvaev |
| 2017/0264570 A1 | 9/2017 | Bugenhagen |
| 2017/0286259 A1 | 10/2017 | Watanabe |
| 2017/0289225 A1 | 10/2017 | Snyder |
| 2017/0331898 A1 | 11/2017 | Lee et al. |
| 2017/0337051 A1 | 11/2017 | Bertani |
| 2017/0344703 A1 | 11/2017 | Ansari et al. |
| 2018/0048773 A1 | 2/2018 | Araki |
| 2018/0139694 A1 | 5/2018 | Folke |
| 2018/0260125 A1 | 9/2018 | Botes et al. |
| 2018/0302443 A1 | 10/2018 | Weiss et al. |
| 2019/0034487 A1 | 1/2019 | Balachandran |
| 2019/0245785 A1 | 8/2019 | Haapanen |
| 2019/0268219 A1 | 8/2019 | Haapanen |
| 2019/0268229 A1* | 8/2019 | Haapanen ............ H04L 41/0803 |
| 2019/0356609 A1* | 11/2019 | Grunwald ............ G06F 16/275 |
| 2020/0170075 A1 | 5/2020 | Xu |
| 2020/0244482 A1 | 7/2020 | Sung et al. |

FOREIGN PATENT DOCUMENTS

| | | |
|---|---|---|
| JP | 2013065223 A | 4/2013 |
| JP | 2017102941 A | 6/2017 |
| WO | WO2017/117076 A | 7/2017 |

OTHER PUBLICATIONS

Haapanen, U.S. Appl. No. 15/903,829, filed Feb. 23, 2018, Office Action, dated Jun. 17, 2020.

Haapanen, U.S. Appl. No. 15/903,818, filed Feb. 23, 2018, Final Office Action, dated Jan. 29, 2020.

Haapanen, U.S. Appl. No. 15/903,818, filed Feb. 23, 2018, Office Action, dated Jun. 17, 2020.

Haapanen, U.S. Appl. No. 15/903,818, filed Feb. 23, 2018, Office Action, dated Sep. 17, 2019.

Haapanen, U.S. Appl. No. 15/903,818, filed Feb. 23, 2018, Advisory Action, dated Apr. 20, 2021.

Haapanen, U.S. Appl. No. 15/903,818, filed Feb. 23, 2018, Interview Summary, dated Apr. 20, 2021.

Haapanen, U.S. Appl. No. 15/903,818, filed Feb. 23, 2018, Final Rejection, dated Jan. 5, 2022.

Haapanen, U.S. Appl. No. 15/892,378, filed Feb. 08, 2018, Notice of Allowance, dated Jun. 10, 2019.

Haapanen, U.S. Appl. No. 15/903,829, filed Feb. 23, 2018, Final Office Action, dated Dec. 28, 2020.

Haapanen, U.S. Appl. No. 15/903,829, filed Feb. 23, 2018, Office Action, dated Sep. 17, 2019.

Haapanen, U.S. Appl. No. 15/903,829, filed Feb. 23, 2018, Final Rejection, dated Jan. 5, 2022.

Haapanen, U.S. Appl. No. 15/903,829, filed Feb. 23, 2018, Advisory Action, dated Apr. 20, 2021.

Haapanen, U.S. Appl. No. 15/903,829, filed Feb. 23, 2018, Interview Summary, dated Apr. 20, 2021.

Haapanen, U.S. Appl. No. 15/903,829, filed Feb. 23, 2018, Office Action, dated Jul. 28, 2021.

Haapanen, U.S. Appl. No. 15/903,818, filed Feb. 23, 2018, Final Office Action, dated Dec. 28, 2020.

Haapanen, U.S. Appl. No. 15/903,818, filed Feb. 23, 2018, Office Action, dated Jul. 28, 2021.

European Patent Office,"Search Report" in application No. 19 155 488.0-1216, dated Aug. 21, 2020, 6 pages.

* cited by examiner

ASSIGNING AND PRIORITIZING MEDIATION SERVERS FOR MONITORING LEGACY DEVICES

CROSS-REFERENCE TO RELATED APPLICATIONS

This application is related to U.S. patent application Ser. No. 15/903,818, filed Feb. 23, 2018, U.S. patent application Ser. No. 15/892,378, filed Feb. 8, 2018, now U.S. Pat. No. 10,447,592, and U.S. patent application Ser. No. 15/903,829, filed Feb. 23, 2018, the entire contents of each of which are hereby incorporated by reference as if fully set forth herein.

This application is related to U.S. patent application No. Ser. No. 17/691,941, filed Mar. 10, 2022, the entire contents of each of which are hereby incorporated by reference as if fully set forth herein.

TECHNICAL FIELD

The present disclosure relates to output devices, such as printers and scanners, and more particularly to coordinated monitoring of legacy output devices using a cloud-based management service.

BACKGROUND

Management of many network devices today, and particularly output devices, requires the use of SNMP protocol. This protocol is based on a management server connecting to a managed device and sending either queries ("SNMP GET") or commands to set data ("SNMP SET") on the managed device.

When a management server is hosted in a cloud system that is outside an enterprise's firewall, it is not possible for the management server to directly connect to managed network devices of the enterprise because firewall policies do not, as a rule, permit incoming SNMP traffic.

Recent managed network devices (e.g., using a Smart Operation Panel (SOP)) enable cloud-based management through the use of a software-based "mediation service" implemented on the managed network device. Such a mediation service initiates contact with the cloud-based management server and then communicates with the managed network device using SNMP. However, many network devices are not capable of supporting a software-based mediation service, whether older network devices or network devices from other manufactures (both referred to herein as "legacy output devices").

In one possible approach, a built-in mediation service is extended to enable the management of legacy devices. However, the reliability of this approach is impacted by the nature of many network devices (such as printers), which are often powered off, unplugged, or moved on an ad hoc basis by end users, administrators, or other office staff.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for the coordinated monitoring of output devices are provided. In a setup approach, multiple mediation services in a local network each discover one or more output devices, such as printers, scanners, and MFPs. Each mediation service reports the discovered output devices to a cloud-based management server. Based on the list of discovered output devices from each mediation service, the cloud-based management server generates a mapping for each output device. The mapping for an output device includes a list of mediation services, one of which is an active mediation service for that output device and the others of which are failover mediation services for that output device. The cloud-based management service transmits, over one or more computer networks, the mapping for an output device to each mediation service in the corresponding list.

In a failover approach, a mediation service receives, from a cloud-based management server, over one or more computer networks, one or more messages that include an identity of an output device, an identity of an active mediation service for the output device, and an identity of each failover mediation service in one or more failover mediation services for the output device. Based on the one of the one or more messages, the mediation service determines that it is a failover mediation service in the one or more failover mediation services. The mediation service eventually determines whether it is to be a new active mediation service for the output device. This determination may be triggered by detecting that the active mediation service for the output device is not responding or active. In response to determining that the mediation service is to be the new active mediation service for the output device, the mediation service transmits, to the cloud-based management server, a notification that indicates that the mediation service is the new active mediation service. The mediation service also initiates monitoring of the output device.

Embodiments improve computer-related technology by ensuring that output devices, including legacy devices, are monitored while keeping network traffic to a minimum.

Embodiments also account for scenarios where an active monitoring service fails or otherwise becomes unavailable. An orderly process ensures that only one failover mediation service becomes the new active monitoring service.

System Overview

Figure 1:
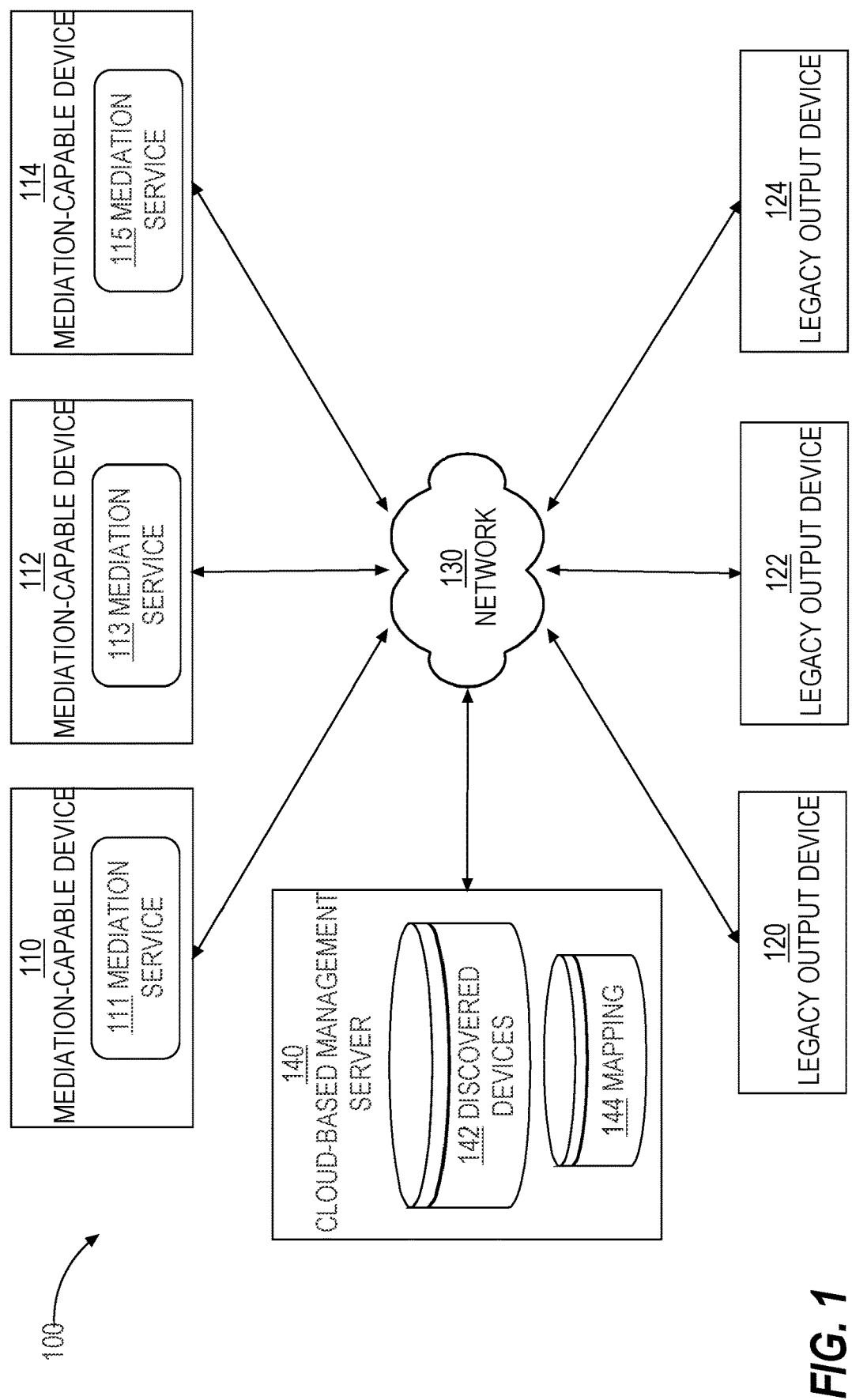
FIG. 1 is a block diagram that depicts an example system for coordinated monitoring of output devices, in an embodiment.

FIG. 1 is a block diagram that depicts an example system 100 for coordinated monitoring of output devices, in an embodiment. System 100 includes mediation-capable devices (MCDs) 110-114, mediation-incapable (or legacy) output devices (LODs) 120-124, a computer network 130, and a cloud-based management server (CBMS) 140. Although three MCDs are depicted, other embodiments may include two or more than three MCDs. Similarly, although three LODs are depicted in FIG. 1, other embodiments may include less or more than three LODs.

An output device is a computing device that produces output, generally based on input from another computer or from a user physically operating the output device. Non-limiting examples of output devices include printers, scanners, copiers, fax machines, digital whiteboards, projectors, and output devices that are capable of performing any combination of these functions, such a multi-function peripheral (MFP).

An output device implements a communication protocol, such as simple networking management protocol (SNMP), that allows other devices to communicate with it to retrieve data about the output device.

A MCD is a device that includes a mediation service that is capable of communicating with output devices and with CBMS 140. For example, MCD 110 includes a mediation service 111, MCD 112 includes a mediation service 113, and MCD 114 includes a mediation service 115. A MCD may perform only the function of a mediation service. Alternatively, a MCD may perform other functions. For example, a MCD may be an output device, such as a printer that implements a print function in addition to hosting a mediation service. Each mediation service also implements the communication protocol (that is used by output devices) to that allow the mediation service to obtain data about output devices. The mediation service transmits that data to CBMS 140.

An LOD is an output device that does not have a mediation service executing thereon. Therefore, an LOD does not communicate with CBMS. However, an LOD implements a communication protocol (e.g., SNMP) that allows a mediation service to discover the LOD and obtain data about the current status and operation settings of the LOD.

CBMS 140 is a service executing in (or hosted on) a cloud service. Example providers of cloud services include Amazon, Google, and Microsoft. Therefore, CBMS 140 is accessible over the Internet. CBMS 140 provides device management and configuration capabilities. In order to communicate with a mediation service within a private enterprise's network, based on standard firewall practices, the mediation service must first send a message to CBMS 140, which allows the CBMS 140 to query the mediation service and obtain (e.g., additional) information about output devices in that enterprise network. CBMS 140 includes a database 142 of discovered devices that is populated by data received from mediation services 111, 113, and 115. CBMS 140 also includes a mapping 144 that maps (or associates) each discovered output device with a list of one or more mediation services. The process for generating this list is described in more detail herein. Although database 142 and mapping 144 are depicted separately, they may be part of the same data storage or even in the same file, table, or other data structure that stores data about discovered devices.

Output Device Discovery

CBMS 140 may discover an output device in an enterprise network in one or more ways. For example, a mediation service searches its local network for output devices. Such a search may be performed: (a) regularly (e.g., every day); (b) automatically by mediation service when it initially detects a connection to the local network; or (c) based on receiving a request from CBMS 140. The use and frequency of a network search may be configurable in order to comply with the enterprise's IT security policies and to minimize the network traffic. Examples of data that a network search discovers pertaining to an output device include an IP address of the output device and a type of the output device, such as a printer, scanner, etc. After the discovery of one or more output devices, the mediation service reports the newly discovered output devices to CBMS 140.

As an alternative to relying on a mediation service to discover new output devices, an external software tool, running on a laptop or desktop computer or mobile device, may be used to perform an ad hoc network discovery. Subsequently, the network discovery tool contacts CBMS 140 and reports the newly discovered output devices to CBMS 140.

Additionally or alternatively, a user operating a computing device contacts CBMS 140 and manually adds output devices, such as through a user interface UI provided by CBMS 140. The UI may include, for each new output device, an IP address field and a device type field. Regarding mediation services, CBMS 140 may automatically determine an IP address of a mediation service. However, in case of duplicated IP addressing schemes on a customer's network, a user might manually enter IP addresses of mediation services.

Figure 2:
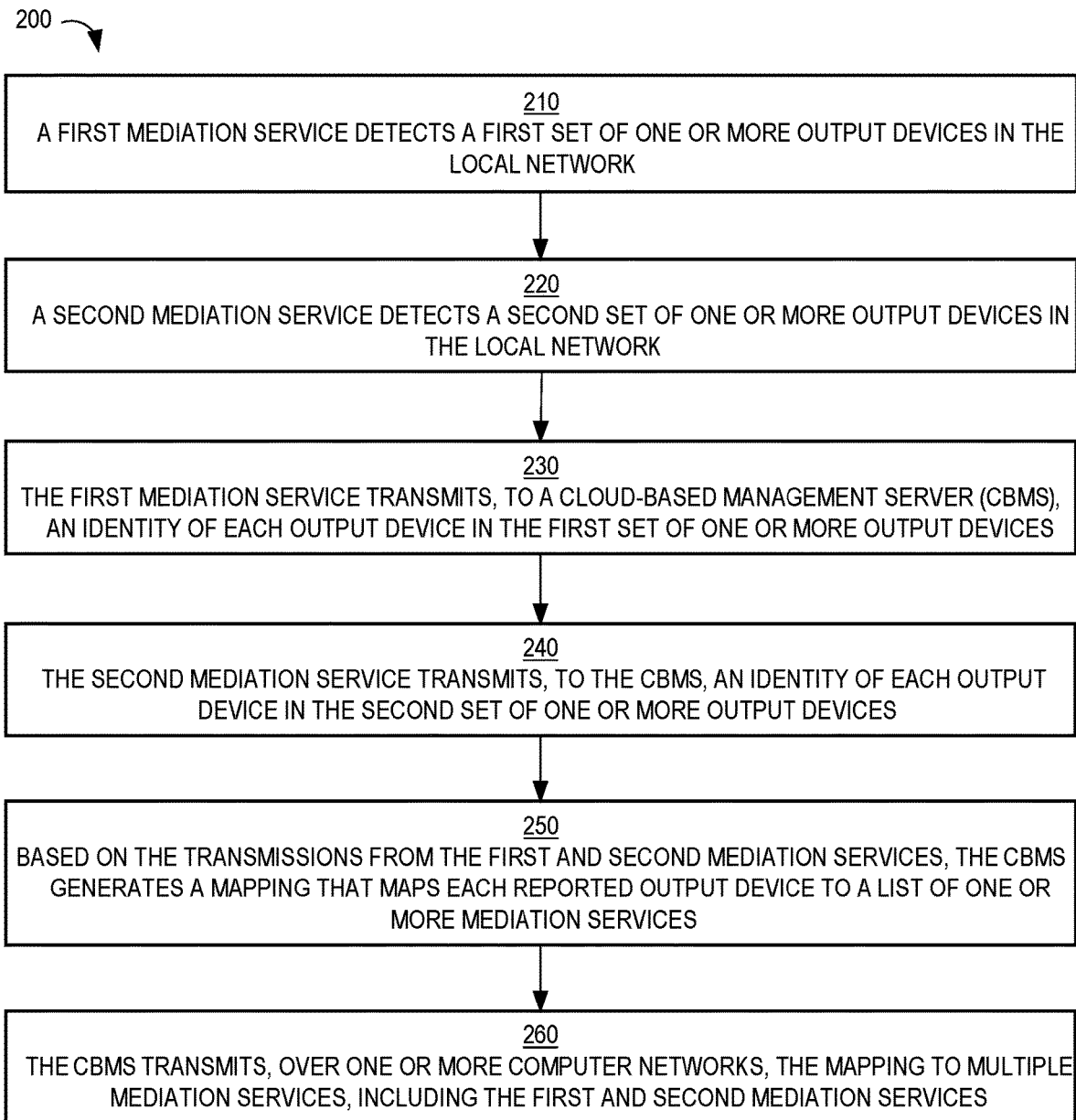
FIG. 2 is a flow diagram that depicts an example process for discovering output devices in a local network, in an embodiment.

FIG. 2 is a flow diagram that depicts an example process 200 for discovering output devices in a local network, in an embodiment. Some blocks of process 200 may be performed by mediation services and other blocks of process 200 may be performed by CBMS 140.

At block 210, a first mediation service detects a first set of one or more output devices in the local network. The first mediation service may use one or more device detection techniques to discover each output device in the first set.

At block 220, a second mediation service detects a second set of one or more output devices in the local network. There may be an overlap in the first set of one or more output devices and the second set of one or more output devices. Alternatively, the two sets of output devices may be distinct.

At block 230, the first mediation service transmits, to CBMS 140, an identity of each output device in the first set of one or more output devices. The transmission is over one or more computer networks, such as the Internet. The first mediation service may be configured with destination data that identifies CMBS 140, such as an IP address. The destination data is used to send the identity information to CBMS 140. A user of the first mediation service may input the destination data into a configuration file accessible to the computing device that hosts the first mediation service. Alternatively, the computing device is pre-configured with the destination data, enabling the first mediation service to be able to communicate with CBMS 140 "out of the box," without manual intervention. Block 230 may be performed before, after, or concurrently with block 220.

At block 240, the second mediation service (similarly) transmits, to CBMS 140, an identity of each output device in the second set of one or more output devices. This transmission is over one or more computer networks, such as the Internet. The second mediation service may be configured with the same destination data that identifies CMBS 140. Block 240 may be performed before, after, or concurrently with blocks 220-230.

At block 250, based on the transmissions from the first and second mediation services, CBMS 140 generates a mapping that maps each reported output device to a list of one or more mediation services. The mapping may indicate which mediation service in a list is the active (or monitoring) mediation service for the corresponding output device and which mediation services are failover (or backup) mediation services for the corresponding output device. The list may be generated using one or more techniques described in more detail herein.

At block 260, CBMS 140 transmits, over one or more computer networks, the mapping to multiple mediation services, including the first and second mediation services. Thus, each mediation service that reported to CBMS 140 may receive the mapping, even if the mediation service does not appear in a list for one of the discovered output devices. Alternatively, CBMS 140 transmits, to a mediation service, a mapping pertaining to an output device only if the mediation service is an active mediation service for that output device or is a failover mediation service for that output device. The process of identifying which mediation services will be active mediation services and which mediation services will be failover mediation services (or both) is described in more detail herein.

Identification of Potential Mediation Services

For a local computer network that is initially unknown to CBMS 140, the discovery by one or more mediation services in the local network take a short amount of time. If multiple mediation services report about output devices that they have discovered and multiple mediation services report about the same set of output devices, then CBMS 140 may receive a considerable amount of duplicate information (e.g., IP addresses of the same output devices) from multiple mediation services. In a stable computer network that CBMS 140 has been receiving data about for some time, new output devices may appear on that network one at a time over time. Nevertheless, multiple mediation services may discover a new output device and report discovery of that new output device to CBMS 140.

In an embodiment, once a discovered output device has been reported by a mediation service to CBMS 140, CBMS 140 determines which mediation services are appropriate for communicating with the output device. In order to reduce network traffic by mediation services and CBMS 140 and to prevent the requirement for implementing deduplication operations on CBMS 140, CBMS 140 may use some of all of the following information to make an output device-mediation service assignment: (1) external IP address of the reporting mediation service; (2) IP address of the output device; and (3) physical location of the output device.

Regarding the external IP address of a reporting mediation service, this can be used to uniquely identify a local site or network. In cases where a site or network may have multiple external IP addresses, CBMS 140 may use a mapping table to determine the site based on the external IPv4 or IPv6 address. CBMS 140 may then use the site location to identify the mediation services on that site, making those potential candidates for communicating with this output device.

Regarding the IP address of the output device, in a scenario where all devices are on the same network and have unique IPv4 or IPv6 addresses, this approach can be used to identify the output device's local subnet. The IP subnet can subsequently be used to identify the mediation services on that subnet, making those potential candidates for communicating with this device.

Regarding physical location of the output device, if the physical location of the output device is identified and tracked, CBMS 140 may identify the site or even a smaller area within a site, such as a building or a floor, based on the previously identified physical location. CBMS 140 may then use the physical location to identify mediation services in near proximity and on that site, making those potential candidates for communicating with this output device.

The following table identifies for each output device that a mediation service discovers, a list of mediation services that discovered that output device or at least are capable of communicating with that output device and are available to monitor that output device:

TABLE A

| Output Device | List of Mediation Services |
|---|---|
| Printer1 | MS1, MS2, MS3 |
| Printer2 | MS1, MS2, MS3 |
| Scanner1 | MS2, MS3 |
| MFP1 | MS2 |

Table A indicates that mediation service 1 (MS1) discovered Printer1 and Printer 2, MS2 discovered all four output devices, and M3 discovered Printer 1, Printer2, and Scanner1.

In related embodiments, table A may include an IP address of each output device, an IP address of each mediation service, and an identification of the site, location, and/or subnet where these sets of devices and mediations services reside.

Determination of Active and Failover Mediation Services

For each discovered output device that has not been assigned a mediation service, CBMS 140 determines an active (or primary) mediation service for that output device based on the list of potential mediation services identified in the previous step. The active mediation service for each output device may be randomly selected. However, this may result in an imbalance of the number of output devices assigned to each mediation service. For example, three output devices might be assigned to a first mediation service, eight output devices may be assigned to a second mediation service, and nineteen output devices may be assigned to a third mediation service Alternatively to a random selection, mediation service assignment may be performed in a round robin fashion where, during the assignment phase, each mediation service is assigned no more than one more output device than any other mediation service and, after assignment is complete, this condition is ensured.

Alternatively, CBMS 140 determines, for each output device, a priority calculation of each candidate mediation service. Mediation service priority with respect to an output device may be based on one or more of the following criteria: (1) physical distance from the output device, if known; (2) network distance from the output device, based on either IP address calculation, or a latency test; and (3) performance or capacity of each mediation service.

Regarding performance or capacity, such may refer to one or more resource utilizations on a computing device that executes or hosts the mediation service, such as CPU utilization, network utilization, and memory utilization. For example, the candidate mediation service that has the least CPU utilization may be selected as the active mediation service. As another example, resource utilization may just be one factor in selecting a candidate mediation service or in ranking the candidate mediation services. As another example, an average resource utilization over time (e.g., all time, or the last week, or the last day) may be used to rank candidate mediation services.

Another measure of performance is how recently the computing device that hosts the mediation service has been shut down or been otherwise unavailable. If the computing device has been shut down most recently or has a history of being taken offline, then the corresponding mediation service may be disqualified or at least unlikely to be selected to be an active mediation service.

If network distance is a criterion to select a mediation service, then CBMS 140 requests each potential mediation service for an output device to perform a "ping" to the output device to determine the network latency. If a candidate (or potential) mediation service is unable to perform a ping, then CBMS 140 removes that candidate mediation service removed from the candidate list for that output device.

Once CBMS 140 selects an active mediation service for an output device, CBMS 140 creates a failover mediation service list of zero or more mediation services based on the potential mediation services that were not selected for the output device. (If only one mediation service detected a particular output device, then that mediation service is automatically selected as the active mediation service for that particular output device.) CBMS 140 may rank the failover list using the same priority criteria. Thus, the failover list may or may not be prioritized.

Therefore, if ten output devices at a particular site are reported to CBMS 140 based on three mediation services at that particular site, then CBMS 140 identifies, for each of the ten output devices, an active mediation service and a failover list that lists potentially two mediation services.

The following is a table that lists the set of output devices of Table 1 along with an assigned active mediation service and a list of failover mediation services:

TABLE B

| Output Device | Active Mediation Service | Failover Mediation Services |
|---|---|---|
| Printer1 | MS1 | MS3, MS2 |
| Printer2 | MS1 | MS2, MS3 |
| Scanner1 | MS2 | MS3 |
| MFP1 | MS2 | N/A |

In this example, two output devices have multiple mediation services in its failover list, one of the output devices only has one mediation service in its failover list, and one of the output devices does not have any mediation services in its failover list.

If active mediation services are selected in a round robin fashion, then MS3 will be assigned as an active mediation service to at least one of the output devices.

Initial Operation

In an embodiment, for each newly discovered output device, CBMS 140 transmits an identity (e.g., an IP address) the active mediation service (assigned to that output device) to the active mediation service and to each mediation service in the failover list (for that output device). For example, if there are five mediation services in a failover list, then CBMS 140 transmits the active mediation service identity to six mediation services: the one active mediation service and the five potential mediation services.

Once a mediation service is informed by CBMS 140 that it is an active mediation service for an output device, that active mediation service initiates monitoring of the output device using SNMP or another similar protocol. Monitoring an output device involves requesting one or more of the following data items: a device status (e.g., Ready, Issue Detected, Warning, Error (which may require a technician)), consumable status (e.g., low toner, no paper), and counter stats representing usage (e.g., a page counter indicating a number of pages printed, a copy counter indicating a number of copies made by the output device, a scan counter indicating a number of scans performed by the output device, a number of black and white pages printed, a number of color pages printed, a number of 1-sided prints, and a number of 2-sided prints).

Monitoring an output device may occur regularly, such as every minute, every hour, every day, etc. Monitoring may involve a pull method or a push method. In a pull method, an active mediation service sends an information request to an output device and the output device responds accordingly.

In a push method, an output device sends device information to an active mediation service automatically without requiring an information request each time. For example, once an output device receives an information request from a mediation service, the output device is configured to regularly send the requested information to that mediation service, or only when any of the requested information changes, such as a device status change, a consumable status change, or a usage change.

After an active mediation service collects such device information from an output device, the active mediation service transmits the device information to CBMS 140. An active mediation service may transmit the device information (pertaining to an output device) (a) each time it receives the device information from the output device or (b) only if the device information has changed from the last time the active mediation service received device information from the output device. In this latter case, the active mediation service retains past instances of device information on a per output device basis and, in response to receiving a subsequent instance of device information from a particular output device, compares that subsequent instance with an immediately prior instance. If there is a difference, then the active mediation service sends the subsequent instance to CBMS 140. In this way, network traffic between the active mediation service and CBMS 140 may be reduced as well as resource utilization of CBMS 140.

The mediation services in the failover list of an output device do not monitor the output device. However, each of these mediation services establishes a connection with the active mediation service in order to monitor the state of the active mediation service. The resources to maintain such a monitoring connection and transmit any status messages is minimal. Only an active mediation service for an output device accepts such a monitoring connection. If a mediation service refuses to accept a monitoring connection, then this indicates that that mediation service is not currently the active mediation service for any output device.

When a failover mediation service establishes a monitoring connection with an active mediation service, the active mediation service transmits a list of monitored output devices (using this monitoring connection). The failover mediation service may use this list to confirm that the active mediation service is monitoring an output device of interest to the failover mediation service.

Based on the foregoing, a mediation service may be an active mediation service (monitoring one or more output devices), a failover mediation service (only maintaining monitoring connections with one or more active mediation services), or a hybrid active/failover mediation service (monitoring one or more output devices and also maintaining one or more monitoring connections with one or more active mediation services).

Failover Detection

A failover mediation service may detect that a connection to an active mediation service for an output device is broken or disconnected. Such a detection may be a TCP layer in a device that hosts the failover mediation service informing the failover mediation service that a TCP connection with the active mediation service is broken. If multiple failover mediation services have a monitoring connection with the active mediation service and the active mediation service goes down or offline, then each failover mediation service may detect that their respective monitoring connection with that active mediation service is broken. Each failover mediation service may attempt (one or more times) to reconnect with that active mediation service for a pre-configured period of time, such as one minute.

New Active Mediation Service Determination

If a monitoring connection from a failover mediation service to an active mediation service is broken or disconnected and a new connection cannot be established, then the failover mediation service determines which failover mediation service will determine whether it will be the new active mediation service for a particular output device that the old active mediation service was monitoring. If there is only one mediation service in a failover list, then that mediation service becomes the new active mediation service for the output device. If there are multiple mediation services in a failover list, then those mediation services need to determine which is going to be the new active mediation service for the output device.

In an embodiment where there are multiple failover mediation services for an output device, the mediation service listed first (or highest) in the failover list becomes the new active mediation service and the one or more other failover mediation services attempt to make monitoring connections with the first listed (new active) mediation service.

In a related embodiment, for example in a scenario where the failover list is not prioritized or ordered, each failover mediation service either (a) waits a random length of time; or (b) waits a length of time that is a multiplier of its queue position. In option (a), the failover mediation service uses its queue position or another unique identifier (within the list) as a seed for a pseudorandom number generator. Such a random wait mitigates the risk that two mediation services initiate a failover concurrently for a single output device. Option (b) ensures that the mediation services earlier in the failover list will attempt to take over the monitoring of the output device first.

Each failover mediation service among multiple failover mediation services that are waiting to become the next active mediation service for an output device will either (a) initiate the failover procedure (described herein) or (b) will be notified (e.g., by CBMS 140) regarding which other failover mediation service is the new active mediation service. If (b) happens to a failover mediation service before (a) begins, then that failover mediation service will not initiate the failover procedure. Instead, that failover mediation service will remain a failover mediation service and will attempt to establish a monitoring connection with the new active mediation service.

Failover Procedure

Once a failover mediation service determines that it is the new active mediation service for an output device that was previously monitored by another mediation service, the failover (now new active) mediation service initiates a failover procedure with the following actions: (1) add the output device (that was previously monitored by the other (failed) mediation service) to a list of output devices to be monitored by the new active mediation service (or establish a new list if the new active mediation service is not yet monitoring any); (2) begin accepting monitoring connections from other mediation services (if not yet accepting them); and (3) notify CBMS 140 that it is now the active mediation service for the output device. Such a notification includes an identity of the new active mediation service and an identity of the output device. In response, CBMS 140 updates its mapping for that output device, computes a new failover list for that output device and sends that updated mapping to each mediation service in the updated failover list (and, optionally, to the new active mediation service). CBMS 140 may first confirm (e.g., by sending a status check to the currently assigned active mediation service for the output device) that the currently active mediation service is no longer responsive to CBMS 140. If the currently active mediation service is responsive to status checks from CBMS 140, then CBMS 140 may reject the request from the failover mediation service that is attempting to be the new active mediation service.

If the failed mediation service was monitoring multiple output devices, then the new active mediation service may be the active mediation service for monitoring (a) just one of those multiple output devices or (b) two or more of those multiple output devices. It is possible that two or more mediation services become the active mediation service for two or more output devices that were previously monitored by the failed mediation service. For example, a failed mediation service was the active mediation service for a first output device and a second output device. A first failover mediation service becomes the active mediation service for the first output device and a second failover mediation service becomes the active mediation service for the second output device.

Figure 3:
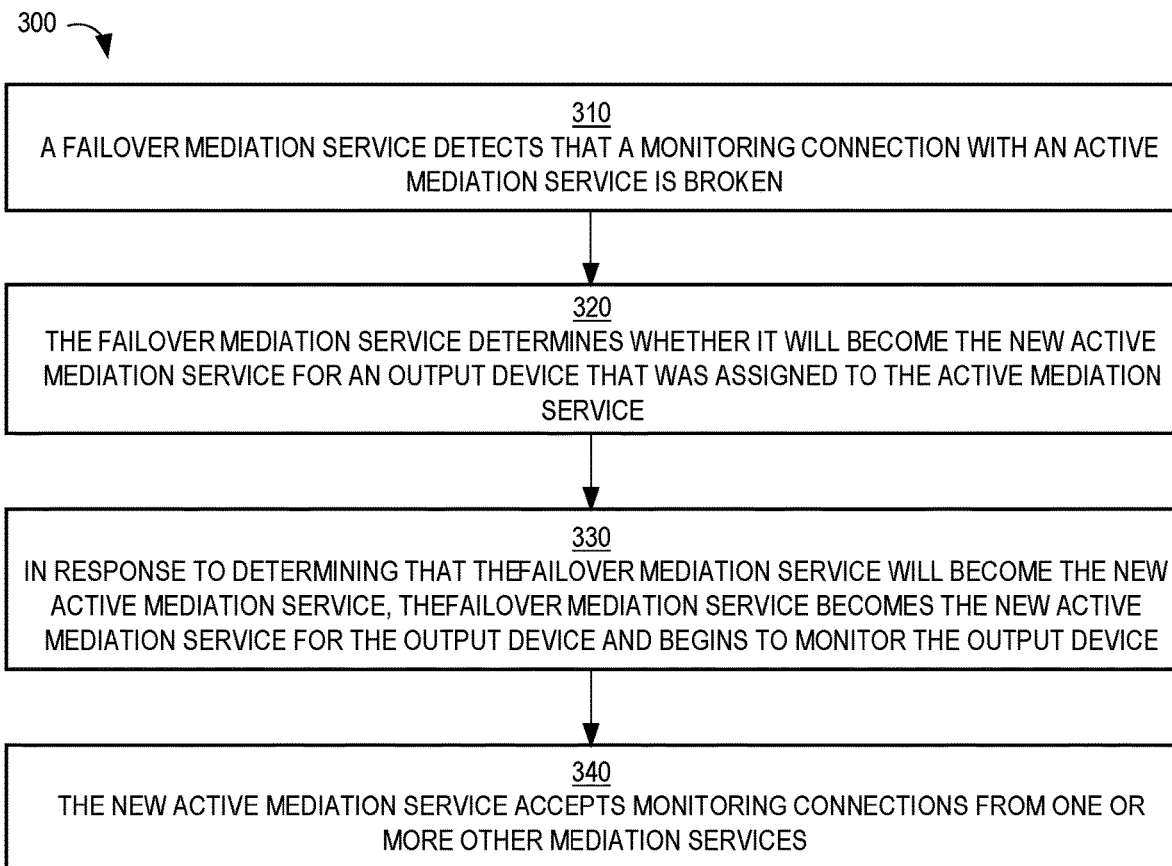
FIG. 3 is a flow diagram that depicts an example process for performing a failover procedure, in an embodiment.

FIG. 3 is a flow diagram that depicts an example process 300 for performing a failover procedure, in an embodiment.

At block 310, a failover mediation service detects that a monitoring connection with an active mediation service is broken. Block 310 may involve the failover mediation service attempting to re-establish the monitoring connection with the active mediation service one or more times.

At block 320, the failover mediation service determines whether it will become the new active mediation service for an output device that was assigned to the active mediation service. Block 320 may involve determining which the failover mediation service has position in a failover list. If the failover mediation service is the first position, then it determines that it will become the new active mediation service. If another technique is used, then the failover mediation service waits for a period of time, such as a pre-configured period of time, a pre-defined period of time that is based on a position of the failover mediation service in the failover list, or a period of time that is generated based on a randomly-generated number.

At block 330, in response to determining that the failover mediation service will become the new active mediation service, the failover mediation service becomes the new active mediation service for the output device and begins to monitor the output device. Block 330 may involve transmitting, over one or more computing networks to CBMS 140, a notification that (1) identifies the failover mediation service as the new active mediation service for the output device and (2) identifies the output device.

At block 340, the new active mediation service accepts monitoring connections from one or more other mediation services. These other mediation services are failover mediation services for the output device and may have previously been classified as failover mediation services for the output device when the previous active mediation service was operating.

EXAMPLES

In the following examples, additional processes, systems, and methods are described in the context of a coordinated system for monitoring output devices, such as a set of output devices in an enterprise or corporate network.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

A first clause is a system, the system comprising one or more processors and one or more storage media storing instructions which, when executed or processed by the one or more processors, cause: (1) receiving, from a cloud-based management server, over one or more computer networks, at a mediation service, one or more messages that include an identity of an output device, an identity of an active mediation service for the output device, and an identity of each failover mediation service in one or more failover mediation services for the output device; (2) based on one of the one or more messages, determining that the mediation service is a failover mediation service in the one or more failover mediation services; (3) determining whether the mediation service is to be a new active mediation service for the output device; and (4) in response to determining that the mediation service is to be the new active mediation service for the output device: (a) transmitting, over the one or more computer networks, to the cloud-based management server, a notification that indicates that the mediation service is the new active mediation service; and (b) initiate monitoring of the output device.

A further clause is the system of the first clause where the instructions, when executed by the one or more processors, further cause determining that a monitoring connection with the active mediation service has failed; where determining whether the mediation service is to be the new active mediation service for the output device in response to determining that the monitoring connection with the active mediation service has failed.

A further clause is the system of the first clause where the one or more failover mediation services are a plurality of failover mediation services, wherein the instructions, when executed by the one or more processors, further cause: establishing a second monitoring connection with each of one or more particular failover mediation services in the plurality of failover mediation services; wherein each of the one or more particular failover mediation services uses the second monitoring connection to determine a status of the new active mediation service.

A further clause is the system of the first clause where the instructions, when executed by the one or more processors, further cause: based on data received from the cloud-based management server, for each output device of a plurality of output devices, storing mediation service data that indicates an active mediation service for said each output device and a set of one or more failover mediation services for said each output device.

A further clause is the system of the first clause where the instructions, when executed by the one or more processors, further cause, prior to receiving the one or more messages: discovering the output device on a local area network in which the mediation service also resides; and transmitting, to the cloud-based management server, a message that identifies the output device and the mediation service.

A further clause is the system of the first clause where the output device is a first output device that is different than a second output device, where the instructions, when executed by the one or more processors, further cause: receiving, from the cloud-based management server, over the one or more computer networks, at the mediation service, one or more second messages (1) that indicate that the mediation service is an active mediation service for the second output device and (2) that include an identity of the second output device and an identity of each failover mediation service in a second one or more failover mediation services for the second output device; and in response to receiving the one or more second messages, initiating monitoring of the second output device.

A further clause is the system of the first clause where the output device is a first output device that is different than a second output device, where the instructions, when executed by the one or more processors, further cause: (1) receiving, from the cloud-based management server, over the one or more computer networks, at the mediation service, one or more second messages that indicate that the mediation service is a failover mediation service for the second output device; (2) establishing a particular monitoring connection with a particular active mediation service for the second output device; in response to determining that the particular monitoring connection has failed, determining a period of time to wait before determining to be a new active mediation service for the second output device; and (3) before the period of time lapses, receiving, from the cloud-based management server, a notification that another mediation service is the new active mediation service for the second output device.

A further clause is the system of the previous clause where the instructions, when executed by the one or more processors, further cause: in response to receiving the notification, establishing a monitoring connection with the other mediation service.

A second clause is a method comprising: receiving, from a cloud-based management server, over one or more computer networks, at a mediation service, one or more messages that include an identity of an output device, an identity of an active mediation service for the output device, and an identity of each failover mediation service in one or more failover mediation services for the output device; based on one of the one or more messages, determining that the mediation service is a failover mediation service in the one or more failover mediation services; determining whether the mediation service is to be a new active mediation service for the output device; in response to determining that the mediation service is to be the new active mediation service for the output device: (i) transmitting, over the one or more computer networks, to the cloud-based management server, a notification that indicates that the mediation service is the new active mediation service; and (2) initiate monitoring of the output device.

A further clause is the method of the second clause, further comprising: determining that a monitoring connection with the active mediation service has failed; wherein determining whether the mediation service is to be the new active mediation service for the output device in response to determining that the monitoring connection with the active mediation service has failed.

A further clause is the method of the second clause where the one or more failover mediation services are a plurality of failover mediation services, further comprising: establishing a second monitoring connection with each of one or more particular failover mediation services in the plurality of failover mediation services; wherein each of the one or more particular failover mediation services uses the second monitoring connection to determine a status of the new active mediation service.

A further clause is the method of the second clause, further comprising: based on data received from the cloud-based management server, for each output device of a plurality of output devices, storing mediation service data that indicates an active mediation service for said each output device and a set of one or more failover mediation services for said each output device.

A further clause is the method of the second clause, further comprising, prior to receiving the one or more messages: discovering the output device on a local area network in which the mediation service also resides; and transmitting, to the cloud-based management server, a message that identifies the output device and the mediation service.

A further clause is the method of the second clause, where the output device is a first output device that is different than a second output device, the method further comprising: receiving, from the cloud-based management server, over the one or more computer networks, at the mediation service, one or more second messages (1) that indicate that the mediation service is an active mediation service for the second output device and (2) that include an identity of the second output device and an identity of each failover mediation service in a second one or more failover mediation services for the second output device; and in response to receiving the one or more second messages, initiating monitoring of the second output device.

A further clause is the method of the second clause, where the output device is a first output device that is different than a second output device, the method further comprising: receiving, from the cloud-based management server, over the one or more computer networks, at the mediation service, one or more second messages that indicate that the mediation service is a failover mediation service for the second output device; establishing a particular monitoring connection with a particular active mediation service for the second output device; in response to determining that the particular monitoring connection has failed, determining a period of time to wait before determining to be a new active mediation service for the second output device; and before the period of time lapses, receiving, from the cloud-based management server, a notification that another mediation service is the new active mediation service for the second output device.

A further clause is the method of the previous clause, further comprising in response to receiving the notification, establishing a monitoring connection with the other mediation service.

A third clause is one or more storage media storing instructions which, when executed or processed by one or more processors, cause: (1) receiving, from a cloud-based management server, over one or more computer networks, at a mediation service, one or more messages that include an identity of an output device, an identity of an active mediation service for the output device, and an identity of each failover mediation service in one or more failover mediation services for the output device; (2) based on one of the one or more messages, determining that the mediation service is a failover mediation service in the one or more failover mediation services; (3) determining whether the mediation service is to be a new active mediation service for the output device; and (4) in response to determining that the mediation service is to be the new active mediation service for the output device: (a) transmitting, over the one or more computer networks, to the cloud-based management server, a notification that indicates that the mediation service is the new active mediation service; and (b) initiate monitoring of the output device.

A further clause is the storage media of the third clause where the instructions, when executed by the one or more processors, further cause determining that a monitoring connection with the active mediation service has failed; where determining whether the mediation service is to be the new active mediation service for the output device in response to determining that the monitoring connection with the active mediation service has failed.

A further clause is the storage media of the third clause where the one or more failover mediation services are a plurality of failover mediation services, wherein the instructions, when executed by the one or more processors, further cause: establishing a second monitoring connection with each of one or more particular failover mediation services in the plurality of failover mediation services; wherein each of the one or more particular failover mediation services uses the second monitoring connection to determine a status of the new active mediation service.

A further clause is the storage media of the third clause where the instructions, when executed by the one or more processors, further cause: based on data received from the cloud-based management server, for each output device of a plurality of output devices, storing mediation service data that indicates an active mediation service for said each output device and a set of one or more failover mediation services for said each output device.

A further clause is the storage media of the third clause where the instructions, when executed by the one or more processors, further cause, prior to receiving the one or more messages: discovering the output device on a local area network in which the mediation service also resides; and transmitting, to the cloud-based management server, a message that identifies the output device and the mediation service.

A further clause is the storage media of the third clause where the output device is a first output device that is different than a second output device, where the instructions, when executed by the one or more processors, further cause: receiving, from the cloud-based management server, over the one or more computer networks, at the mediation service, one or more second messages (1) that indicate that the mediation service is an active mediation service for the second output device and (2) that include an identity of the second output device and an identity of each failover mediation service in a second one or more failover mediation services for the second output device; and in response to receiving the one or more second messages, initiating monitoring of the second output device.

A further clause is the storage media of the third clause where the output device is a first output device that is different than a second output device, where the instructions, when executed by the one or more processors, further cause: (1) receiving, from the cloud-based management server, over the one or more computer networks, at the mediation service, one or more second messages that indicate that the mediation service is a failover mediation service for the second output device; (2) establishing a particular monitoring connection with a particular active mediation service for the second output device; in response to determining that the particular monitoring connection has failed, determining a period of time to wait before determining to be a new active mediation service for the second output device; and (3) before the period of time lapses, receiving, from the cloud-based management server, a notification that another mediation service is the new active mediation service for the second output device.

A further clause is the storage media of the previous clause where the instructions, when executed by the one or more processors, further cause: in response to receiving the notification, establishing a monitoring connection with the other mediation service.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
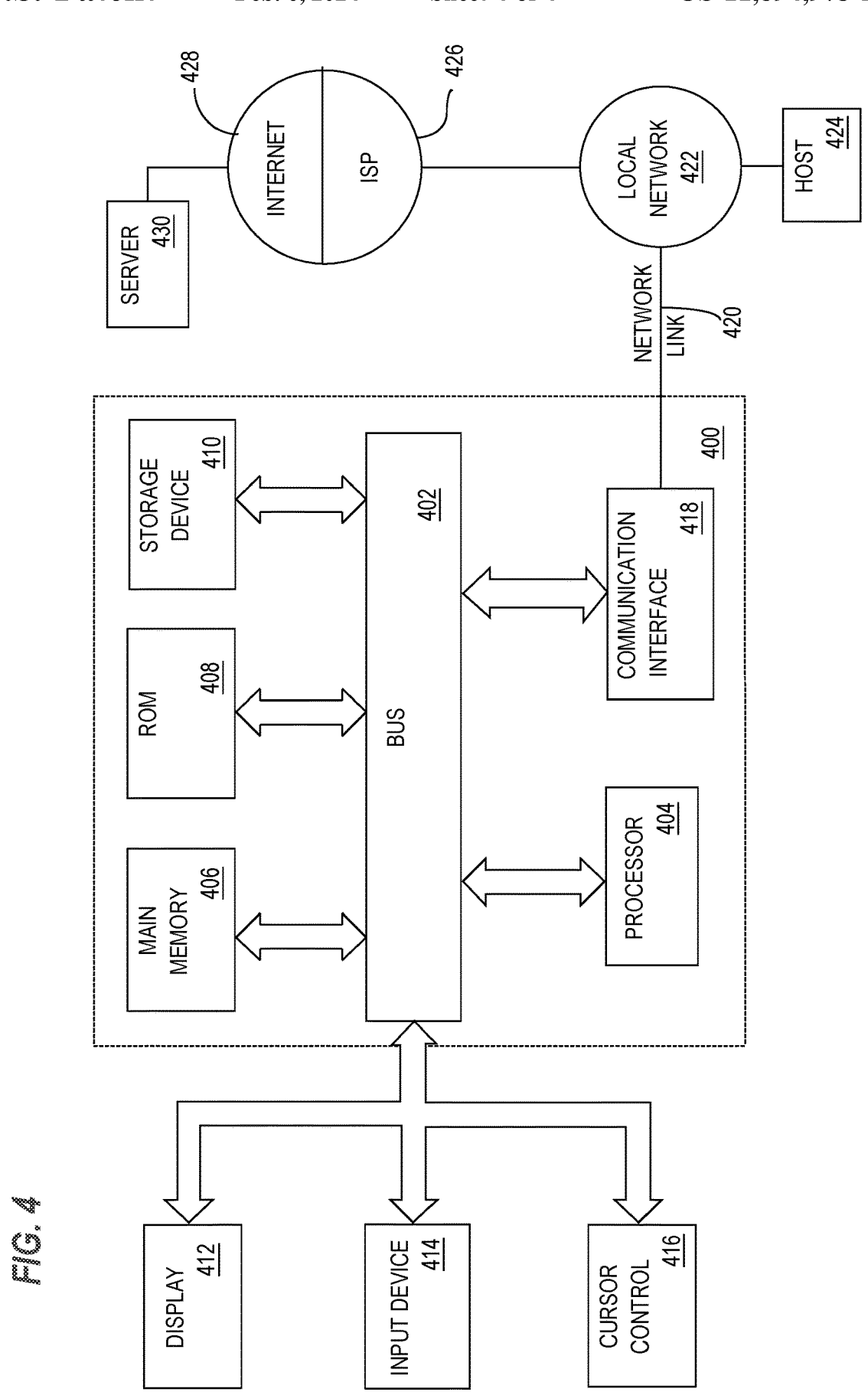
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more processors;
   one or more storage media storing instructions which, when executed by the one or more processors, cause:
   receiving, from a cloud-based management server, over one or more computer networks, at a mediation service, one or more messages that include an identity of an output device, an identity of an active mediation service for the output device, and an identity of each failover mediation service in one or more failover mediation services for the output device;
   based on one of the one or more messages, determining that the mediation service is a failover mediation service in the one or more failover mediation services;
   after determining that the mediation service is a failover mediation service based on the one of the one or more messages from the cloud-based management server, determining, by the mediation service, that the mediation service is to be a new active mediation service for the output device;
   in response to determining that the mediation service is to be the new active mediation service for the output device:
   transmitting, over the one or more computer networks, to the cloud-based management server, a notification that indicates that the mediation service is the new active mediation service; and
   initiate monitoring of the output device.

2. The system of claim 1, wherein the instructions, when executed by the one or more processors, further cause:
   determining that a monitoring connection with the active mediation service has failed;
   wherein determining that the mediation service is to be the new active mediation service for the output device is performed in response to determining that the monitoring connection with the active mediation service has failed.

3. The system of claim 1, wherein the one or more failover mediation services are a plurality of failover mediation services, wherein the instructions, when executed by the one or more processors, further cause:
   establishing a second monitoring connection with each of one or more particular failover mediation services in the plurality of failover mediation services;
   wherein each of the one or more particular failover mediation services uses the second monitoring connection to determine a status of the new active mediation service.

4. The system of claim 1, wherein the instructions, when executed by the one or more processors, further cause:
   based on data received from the cloud-based management server, for each output device of a plurality of output devices, storing mediation service data that indicates an active mediation service for said each output device and a set of one or more failover mediation services for said each output device.

5. The system of claim 1, wherein the instructions, when executed by the one or more processors, further cause:
   prior to receiving the one or more messages:
   discovering the output device on a local area network in which the mediation service also resides;

transmitting, to the cloud-based management server, a message that identifies the output device and the mediation service.

6. The system of claim 1, wherein the output device is a first output device that is different than a second output device, wherein the instructions, when executed by the one or more processors, further cause:
receiving, from the cloud-based management server, over the one or more computer networks, at the mediation service, one or more second messages (1) that indicate that the mediation service is an active mediation service for the second output device and (2) that include an identity of the second output device and an identity of each failover mediation service in a second one or more failover mediation services for the second output device;
in response to receiving the one or more second messages, initiating monitoring of the second output device.

7. The system of claim 1, wherein the output device is a first output device that is different than a second output device, wherein the instructions, when executed by the one or more processors, further cause:
receiving, from the cloud-based management server, over the one or more computer networks, at the mediation service, one or more second messages that indicate that the mediation service is a failover mediation service for the second output device;
establishing a particular monitoring connection with a particular active mediation service for the second output device;
in response to determining that the particular monitoring connection has failed, determining a period of time to wait before determining to be a new active mediation service for the second output device;
before the period of time lapses, receiving, from the cloud-based management server, a notification that another mediation service is the new active mediation service for the second output device.

8. The system of claim 7, wherein the instructions, when executed by the one or more processors, further cause:
in response to receiving the notification, establishing a monitoring connection with the other mediation service.

9. A method comprising:
receiving, from a cloud-based management server, over one or more computer networks, at a mediation service, one or more messages that include an identity of an output device, an identity of an active mediation service for the output device, and an identity of each failover mediation service in one or more failover mediation services for the output device;
based on one of the one or more messages, determining that the mediation service is a failover mediation service in the one or more failover mediation services;
after determining that the mediation service is a failover mediation service based on the one of the one or more messages from the cloud-based management server, determining, by the mediation service, that the mediation service is to be a new active mediation service for the output device;
in response to determining that the mediation service is to be the new active mediation service for the output device:
transmitting, over the one or more computer networks, to the cloud-based management server, a notification that indicates that the mediation service is the new active mediation service; and
initiate monitoring of the output device;
wherein the method is performed by the one or more computing devices.

10. The method of claim 9, further comprising:
determining that a monitoring connection with the active mediation service has failed;
wherein determining that the mediation service is to be the new active mediation service for the output device is performed in response to determining that the monitoring connection with the active mediation service has failed.

11. The method of claim 9, wherein the one or more failover mediation services are a plurality of failover mediation services, further comprising:
establishing a second monitoring connection with each of one or more particular failover mediation services in the plurality of failover mediation services;
wherein each of the one or more particular failover mediation services uses the second monitoring connection to determine a status of the new active mediation service.

12. The method of claim 9, further comprising:
based on data received from the cloud-based management server, for each output device of a plurality of output devices, storing mediation service data that indicates an active mediation service for said each output device and a set of one or more failover mediation services for said each output device.

13. The method of claim 9, further comprising:
prior to receiving the one or more messages:
discovering the output device on a local area network in which the mediation service also resides;
transmitting, to the cloud-based management server, a message that identifies the output device and the mediation service.

14. The method of claim 9, wherein the output device is a first output device that is different than a second output device, further comprising:
receiving, from the cloud-based management server, over the one or more computer networks, at the mediation service, one or more second messages (1) that indicate that the mediation service is an active mediation service for the second output device and (2) that include an identity of the second output device and an identity of each failover mediation service in a second one or more failover mediation services for the second output device;
in response to receiving the one or more second messages, initiating monitoring of the second output device.

15. The method of claim 9, wherein the output device is a first output device that is different than a second output device, further comprising:
receiving, from the cloud-based management server, over the one or more computer networks, at the mediation service, one or more second messages that indicate that the mediation service is a failover mediation service for the second output device;
establishing a particular monitoring connection with a particular active mediation service for the second output device;
in response to determining that the particular monitoring connection has failed, determining a period of time to wait before determining to be a new active mediation service for the second output device;
before the period of time lapses, receiving, from the cloud-based management server, a notification that another mediation service is the new active mediation service for the second output device.

16. The method of claim 15, further comprising:

in response to receiving the notification, establishing a monitoring connection with the other mediation service.

17. One or more storage media storing instructions which, when executed by one or more processors, cause:

receiving, from a cloud-based management server, over one or more computer networks, at a mediation service, one or more messages that include an identity of an output device, an identity of an active mediation service for the output device, and an identity of each failover mediation service in one or more failover mediation services for the output device;

based on one of the one or more messages, determining that the mediation service is a failover mediation service in the one or more failover mediation services;

after determining that the mediation service is a failover mediation service based on the one of the one or more messages from the cloud-based management server, determining, by the mediation service, that the mediation service is to be a new active mediation service for the output device;

in response to determining that the mediation service is to be the new active mediation service for the output device:

transmitting, over the one or more computer networks, to the cloud-based management server, a notification that indicates that the mediation service is the new active mediation service; and initiate monitoring of the output device.

18. The one or more of claim 17, wherein the instructions, when executed by the one or more processors, further cause:

determining that a monitoring connection with the active mediation service has failed;

wherein determining that the mediation service is to be the new active mediation service for the output device is performed in response to determining that the monitoring connection with the active mediation service has failed.

19. The one or more of claim 17, wherein the one or more failover mediation services are a plurality of failover mediation services, wherein the instructions, when executed by the one or more processors, further cause:

establishing a second monitoring connection with each of one or more particular failover mediation services in the plurality of failover mediation services;

wherein each of the one or more particular failover mediation services uses the second monitoring connection to determine a status of the new active mediation service.

20. The one or more of claim 17, wherein the instructions, when executed by the one or more processors, further cause:

based on data received from the cloud-based management server, for each output device of a plurality of output devices, storing mediation service data that indicates an active mediation service for said each output device and a set of one or more failover mediation services for said each output device.

* * * * *